US005379033A

United States Patent [19]

Fujii et al.

[11] Patent Number: 5,379,033

[45] Date of Patent: Jan. 3, 1995

[54] REMOTE CONTROL DEVICE

[75] Inventors: Shohei Fujii, Natro; Katsumi Suitsu, Miyagi, both of Japan

[73] Assignee: Alps Electric Co., Ltd., Tokyo, Japan

[21] Appl. No.: 920,748

[22] Filed: Jul. 28, 1992

[30] Foreign Application Priority Data

Aug. 9, 1991 [JP] Japan .................................. 3-225062

[51] Int. Cl.[6] ................................................ H04Q 1/00

[52] U.S. Cl. ........................... 340/825.69; 340/825.31; 340/825.72

[58] Field of Search ........... 340/825.3, 825.31, 825.69, 340/825.72, 825.54, 825.77

[56] References Cited

U.S. PATENT DOCUMENTS

| | | | |
|---|---|---|---|
| 3,725,939 | 4/1973 | Saltzstein | 340/825.77 |
| 4,669,352 | 2/1987 | Fujii | 340/825.69 |
| 4,763,121 | 8/1988 | Tomoda et al. | 340/825.54 |
| 4,980,681 | 12/1990 | Noel | 340/825.72 |
| 4,987,406 | 1/1991 | Reid . | |
| 5,109,221 | 4/1992 | Lambropoulos et al. | 340/825.37 |
| 5,157,389 | 10/1992 | Kurozu et al. | 340/825.32 |

*Primary Examiner*—Donald J. Yusko
*Assistant Examiner*—Brian Zimmerman
*Attorney, Agent, or Firm*—Guy W. Shoup; Patrick T. Bever

[57] ABSTRACT

A remote control device is designed such that it enables an object to be remotely controlled to execute an operation only by the user approaching the object to be remotely controlled. When the user who carries the transmitter 1 depresses an operation button A at a position distant from an automobile 2, the transmitter intermittently transmits a signal containing identification information and command information corresponding to the operation button A. As the user comes closer to the automobile 2 and enters an automatic operation area, the reception level of a receiver 3 exceeds a predetermined value, and the transmission signal is thereby received. The identification information and the command information of the reception signal are decoded, and an operation corresponding to the command information, e.g., door unlocking, is executed by an execution portion 4.

14 Claims, 5 Drawing Sheets

REMOTE CONTROL DEVICE

BACKGROUND OF THE INVENTION

1. Field of the Invention

The present invention relates to a remote control device which enables, for example, a door unlocking operation for automobiles to be performed, and more particularly, to a remote control device which enables a remote control operation to be automatically executed by the user's approaching an object to be remotely controlled, such as an automobile .

2. Description of the Related Art

In recent years, practical use of the remote control devices for automobiles has begun . This remote control device is operated in the manner described below: the user of the automobile carries; a small transmitter with him or her. When he or she depresses, for example, a door unlocking button provided on the transmitter near the automobile, the transmitter transmits a FM modulated signal containing identification information and command information. A receiver provided on the automobile decodes the signal transmitted from the transmitter, and outputs an execution signal on the command information to an execution portion when coincidence of the identification information is obtained. Thus, the door is unlocked by an operation mechanism in the execution portion.

However, in the aforementioned remote control device, the user who carries the transmitter must be within a distance where the transmission signal can reach the receiver loaded on the automobile or the like when he or she depresses the operation button. Thus, the user must always keep the distance to the automobile or the like in mind.

Also, when the user tries to use the transmitter at a distance close enough to the automobile with baggages in his or her both hands, he or she must let go of the baggages in the hands temporarily and operate the transmitter. This is inconvenient.

SUMMARY OF THE INVENTION

In view of the aforementioned problems of the conventional remote control device, an object of the present invention is to provide a remote control device which enables a remote control operation to be automatically executed when the user who carries a transmitter comes to a certain distance from an object to be remotely controlled, such as an automobile.

To achieve the above object, the present invention provides a remote control device which comprises a transmitter for intermittently transmitting a signal containing identification information and command information, a receiver for receiving the information transmitted from the transmitter and for decoding the identification information and the command information contained in the received signal when the reception output exceeds a predetermined value, and an execution portion for executing an operation on the basis of the command decoded by the receiver.

In the remote control device according to the present invention, the user who carries a transmitter depresses, for example, a door unlocking button when he or she is at a certain distance from an object to be remotely controlled, such as an automobile. At that time, the transmitter intermittently transmits a signal containing identification information and command information. When the user who carries the transmitter comes to a predetermined distance from the automobile and the output of a receiver loaded on the automobile or the like thereby exceeds a predetermined level, the receiver decodes the identification information and the command information and supplies an operation command to a driving mechanism serving as an execution portion to perform unlocking of the door.

DETAILED DESCRIPTION OF THE PREFERRED EMBODIMENTS

An embodiment of the present invention will now be described with reference to the accompanying drawings.

Figure 1:
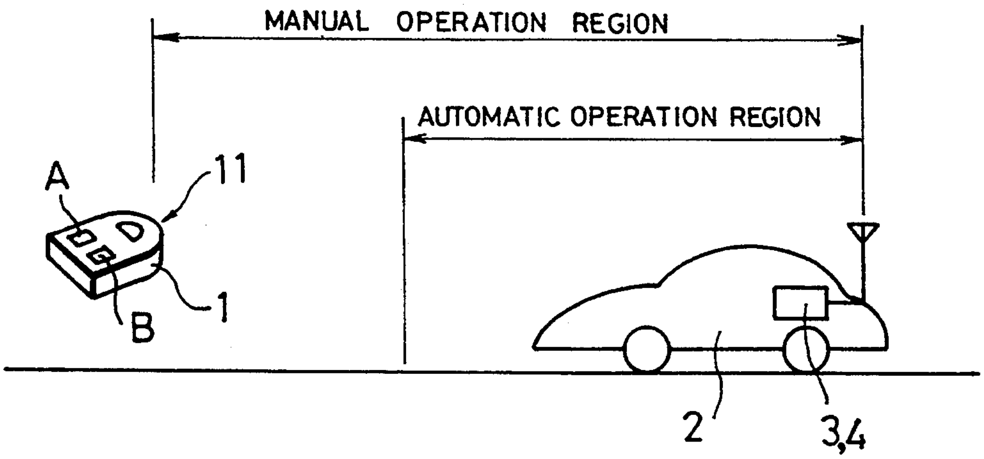
FIG. 1 is an external view of a transmitter and an automobile which is an object to be remotely operated.
Figure 2:
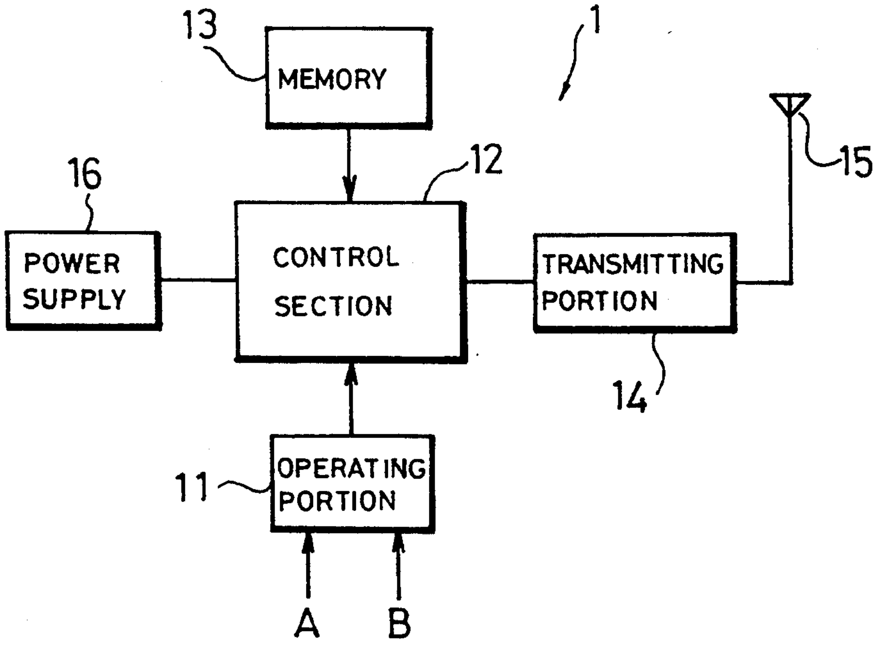
FIG. 2 is a circuit diagram of the transmitter.
Figure 3:
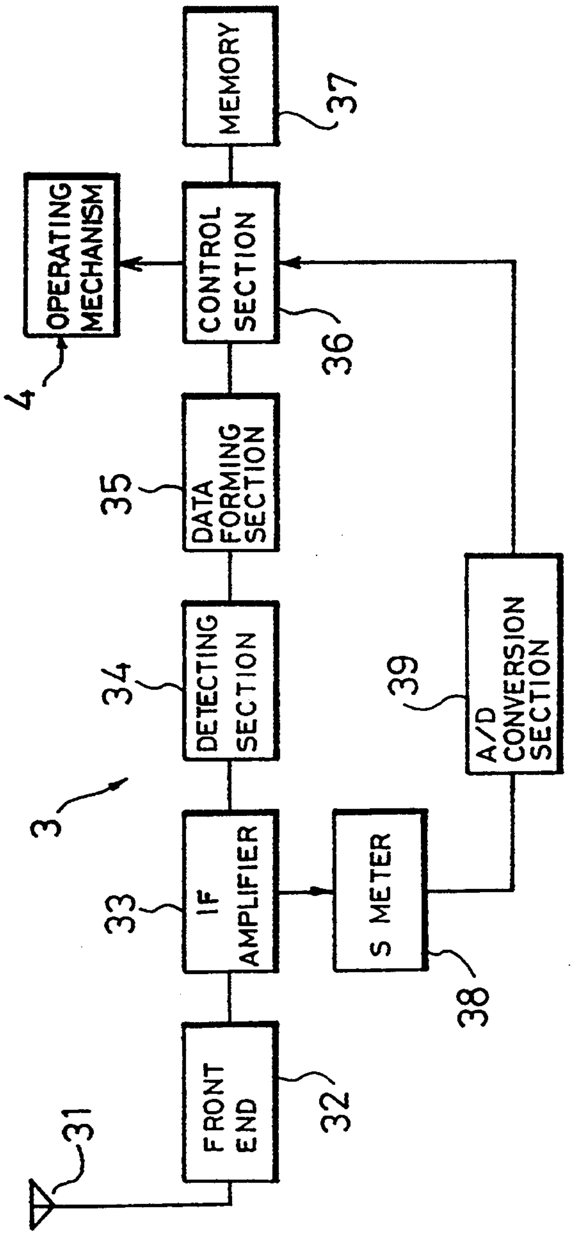
FIG. 3 is a circuit diagram of a receiver and an execution portion.
Figure 4:
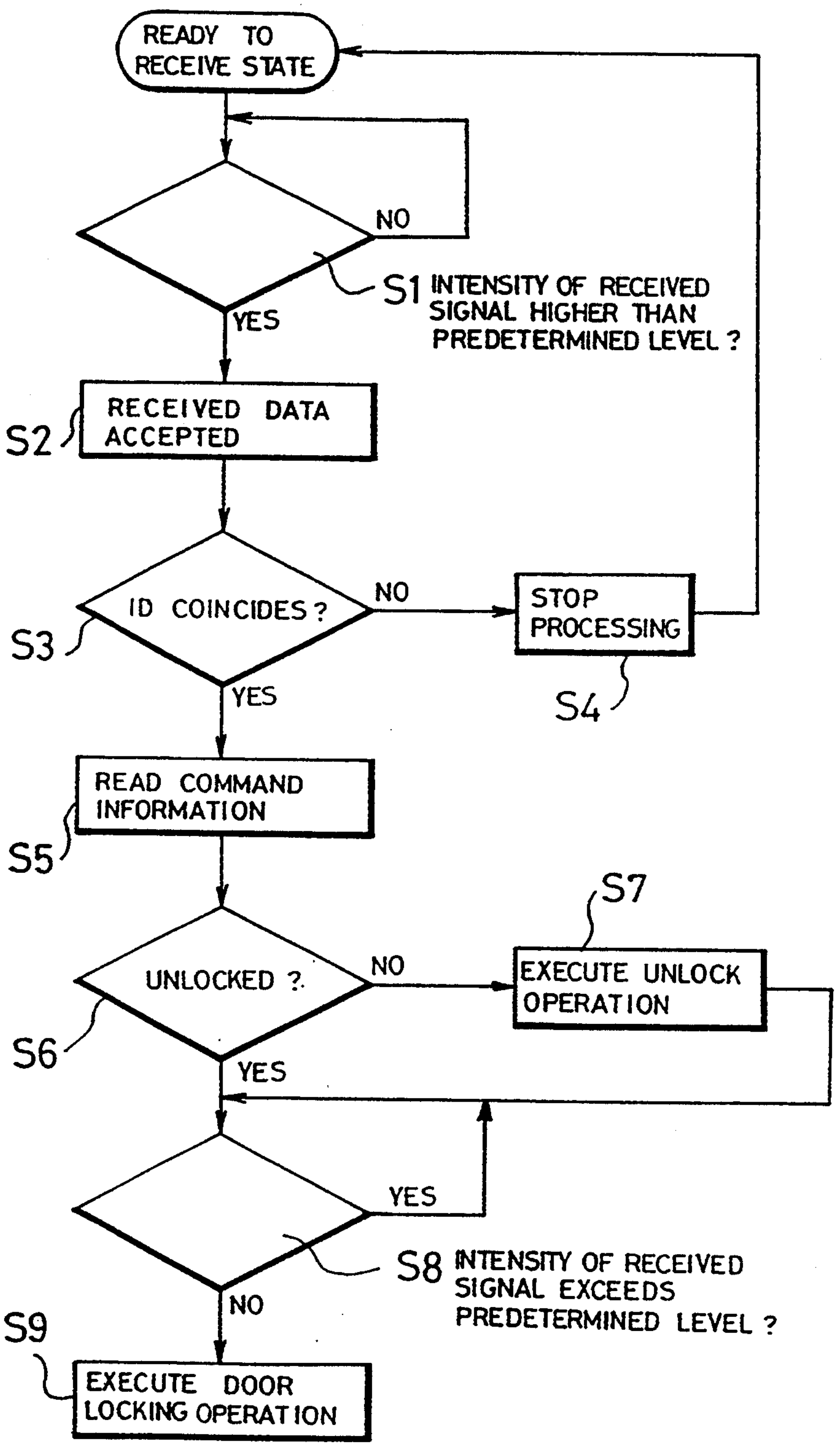
FIG. 4 is a flowchart of the control operation of a control section of the receiver.
Figure 5:
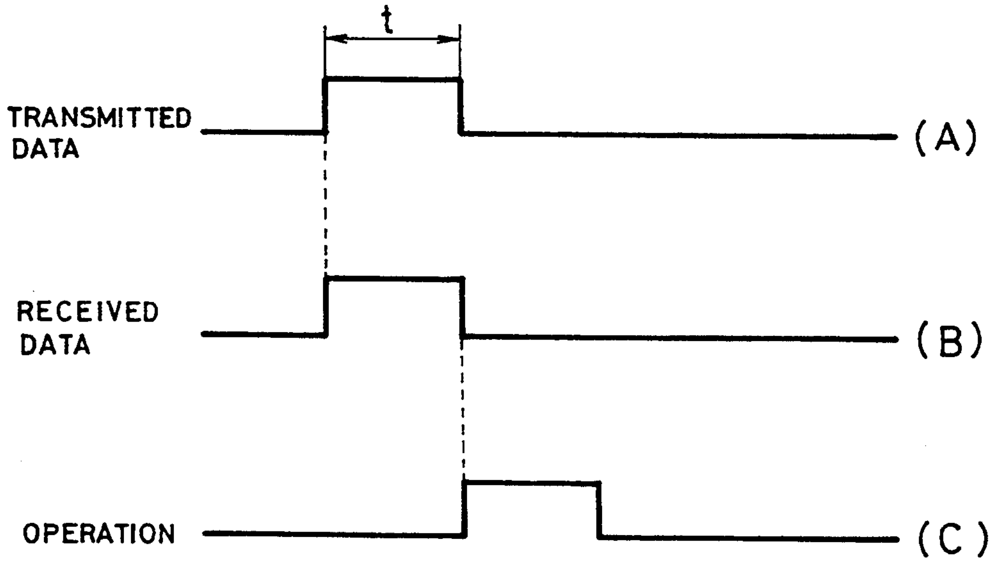
FIGS. 5(A), 5(B) and 5(C) are graphs showing the signals in a manual operation.
Figure 6:
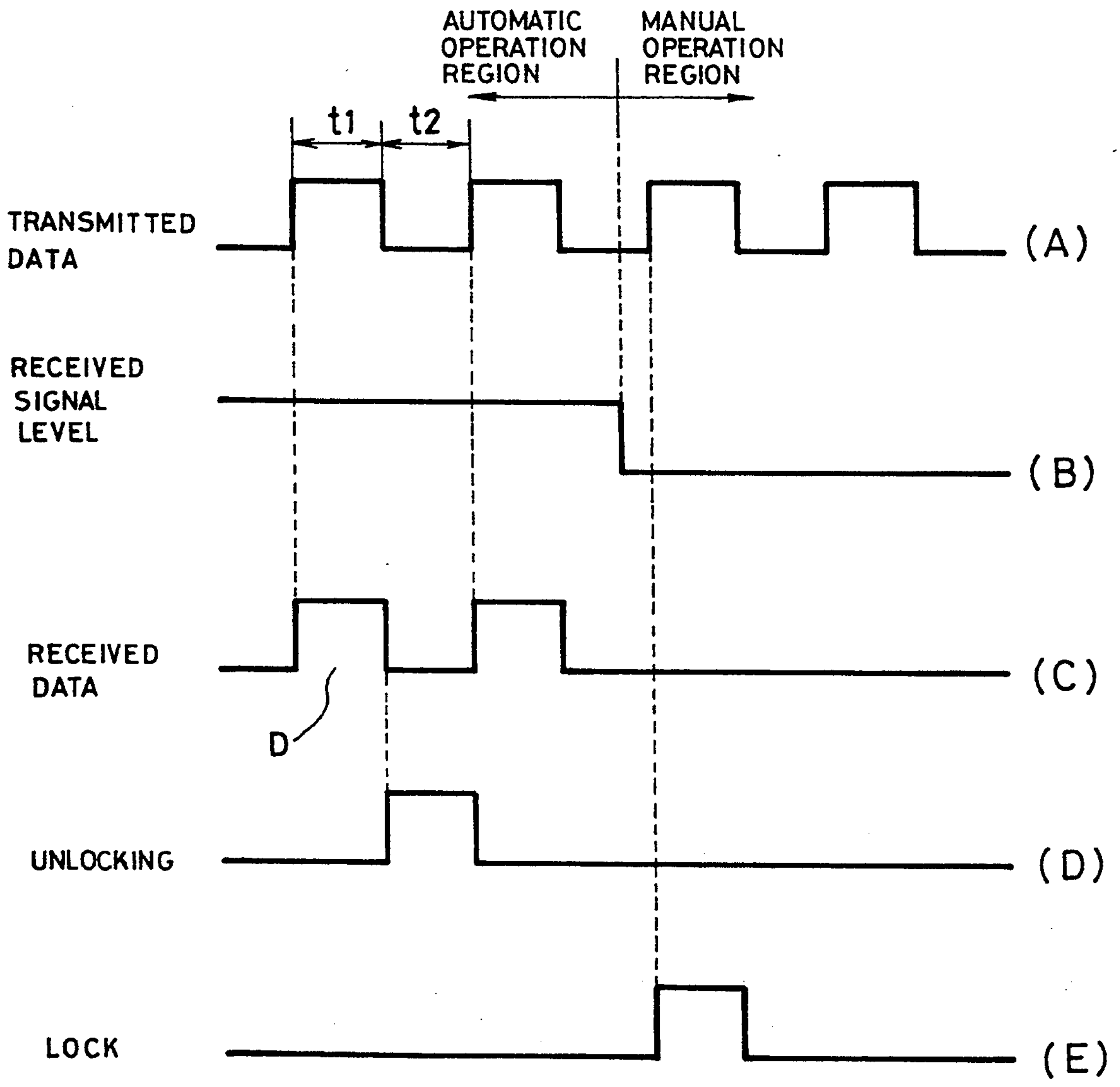
FIGS. 6(A), 6(B) and 6(C) are graphs showing the signals in an intermittent transmission operation.

FIG. 1 is an external view of a transmitter and an automobile which is an object to be remotely controlled. FIG. 2 is a circuit diagram of the transmitter. FIG. 3 is a circuit diagram of a receiver and an execution portion. FIG. 4 is a flowchart showing the operation of the reception side. FIGS. 5 and 6 show transmission and reception signals.

In FIG. 1, reference numerals 1 and 2 denote a transmitter and an automobile which is an object to be remotely controlled, respectively. A receiver 3 and an operation mechanism 4 serving as an execution portion are mounted on the automobile 2.

The transmitter 1 is small and is thus easily carried from one place to another. The: transmitter has an operation section 11 on the surface thereof. As shown in FIG. 2, the transmitter 1 includes this operation section 11, a control section 12 which is mainly composed of a CPU, a memory 13, a transmitting section 14, an antenna 15 and a power source 16.

The control section 12 generates a transmission signal containing predetermined identification information stored in the memory 13 and command information corresponding to the operation input from the operation section 11. The control section 12 also transmits the generated transmission signal intermittently. This intermittent transmission is executed by a software stored in the control section 12. The control section 12 is provided with a timer for determining the time duration of the intermittent transmission.

The transmission signal generated by the control section 12 is FM modulated by the transmitting section 14. The FM modulated signal is transmitted from the antenna 15 at a predetermined frequency.

As shown in FIG. 1, the operation section 11 of the transmitter 1 has various operation buttons. When a certain operation button is depressed, the control section 12 generates command information corresponding to the operation data of that operation button, such as automobile door unlocking, trunk unlocking or turning on a room lamp. In this embodiment, there are two types of buttons, like A and B, regarding the command button for, for example, door unlocking. When the command button A is depressed, the control section 12 intermittently sends out the command information corresponding to that command button, e.g., the command information on door unlocking, together with the identification information, and the transmitting section 14 transmits that intermittent signal at a low output. When the operation button B is depressed, the control section 12 similarly and continuously (while the operation button is being depressed) sends out the command information on door unlocking together with the identification information, and the transmitter 14 transmits the continuous signal at a high output. Intermittent transmission conducted at a low level when the operation button A is depressed is used to automatically activate the execution portion 4 mounted on the automobile when the usher approaches the automobile 2 and enters the automatic operation area shown in FIG. 1. Continuous transmission at a high level conducted when the operation button B is depressed is used to remotely control the execution portion in the automobile 2 when the user is in a manual operation area shown in FIG. 1 which is separated from the automobile by a certain distance.

When the signal is intermittently transmitted from the transmitter 1, intermittent transmission continues for a fixed period of time. It may be arranged such that this time duration in which intermittent transmission continues is changed over from the operation section 11 of the transmitter 1. This change-over may be performed using a change-over switch. Alternatively, it may be performed by changing the number of times the operation button A is operated. For example, if the operation button A is activated once, intermittent transmission may last for five minutes. If the operation button A is activated twice, intermittent transmission may last for ten minutes. If the operation button A is operated three times, intermittent transmission may last for fifteen minutes. In that case, change over of the time duration in which the intermittent transmission continues may be executed by changing over the timer provided in the control section 12 according to the number of times the operation button A is operated. The time during which the intermittent transmission lasts may be set by changing the time during which the operation button A is kept depressed.

The operation buttons A and B are used to output the same operation command, such as automobile door unlocking. In the operation section 11 of the transmitter 1, the operation buttons for the other operation commands are also provided, such as trunk unlocking or turning on of the room lamp. Hence, the user may desire to operate both the operation button A for door unlocking and the operation button for trunk unlocking at the same time. This may be accomplished by programing the control section 12 such that both the intermittent signal for door unlocking and the intermittent signal for trunk unlocking are alternately transmitted.

FIG. 3 is a circuit diagram of the receiver 3 mounted on the automobile and the operation mechanism 4 serving as the execution portion.

In the receiver 3, a signal received by the antenna 31 is converted into an intermediate bandwidth signal by a front end processor 32. The intermediate bandwidth signal is amplified by an IF amplifier 33, and is then detected by a detecting section 34. The data shaped by a data shaping section 35 is sent to a control section 36. The control section 36, mainly composed of a CPU, compares the identification information in the signal sent from the data shaping section 35 with the identification information stored in the memory 37, and processes the command information when they coincide with each other. The control section 36 outputs the operation command corresponding to the command information to the operation mechanism 4. The operation mechanism 4 executes, for example, unlocking of the automobile door, according to the operation command sent from the control section 36.

In the receiver 3, the output of the IF amplifier 33 is sent to a S meter 38 which measures the magnitude of the electric field of the received signal input from the IF amplifier 33. The measurement output is converted into a digital value by an A/D converter 39. The obtained digital value is sent to the control section 36.

When the operation button A is depressed in the transmitter 1, an intermittent signal is transmitted at a low level. Thus, determination as to whether or not the transmitter 1 has come within the automatic operation area shown in FIG. 1 can be made by measuring the magnitude of the reception output by means of the S meter 38 of the receiver 3 .

The operation of the remote control device will be described below.

Unlocking of the door of the automobile 2, conducted with the operation button A or B, will be explained below as an example of the operation.

FIG. 5 illustrates the transmission operation when the operation button B of the operation section 11 of the transmitter 1 is depressed.

When the operation button B is depressed, the control section 12 sends out the transmission data over a time t during which the operation button B is depressed (FIG. 5 (A)). This transmission data consists of identification information (ID code) set in the memory 13, and the command information subsequent to the identification information and representing door unlocking. The transmission data is FM modulated by the transmitting section 14. The FM modulated signal is transmitted from the antenna 15. This transmission output is transmitted at a high level so that it can reach the automobile 2 when the transmitter 1 is within a certain distance (within the manual operation area shown in FIG. 1) from the automobile 2.

In the receiver 3 shown in FIG. 3, the transmission signal is received by the antenna 31. The received signal is mixed with a locally oscillated frequency by the front end processor 32 to generate a signal of an intermediate bandwidth. This intermediate bandwidth signal is amplified by the IF amplifier 33, The magnitude of the electric field of the amplified signal is detected by the S meter 38. The detected signal is converted into a digital value by the A/D converter 39 and is then sent to the control section 36. The control section 36 accepts the reception data, as shown in FIG. 5(B) when reception is conducted at a fixed magnitude or above. The control section 36 compares the identification information contained in the received signal with the identification information stored in the memory 37, decodes the command signal in the received data when coincidence of the identification information is obtained, and gives the door unlocking command to the operation mechanism 4 at a timing shown in FIG. 5(C). The door is automatically unlocked by the operation mechanism 4.

The case in which the operation button A of the operation section 11 of the transmitter 1 is used will be described below.

When the user depresses the operation button A at a position remote from the automobile 2, the control section 36 of the transmitter 1 generates intermittent transmission data shown in FIG. 6(A)). This transmission data consists of the identification information and the command information representing door unlocking. A signal having a width of t1 is transmitted on and off at time intervals of t2, as shown in FIG. 6(A). The overall transmission time of this intermittent signal is set by the number of times the operation button A is depressed, the time during which the operation button A is depressed or the change-over switch, like five, ten or fifteen minutes.

The control operation of the control section 36 of the receiver 3 which receives the intermittent transmission signal will be explained below with reference to the flowchart of FIG. 4.

The receiver 3 mounted on the automobile 2 is supplied with power from the battery mounted on the automobile. The magnitude of the electric field of the signal received by the antenna 31 is detected by the S meter 38 connected to the IF amplifier 33. The detected signal is converted into a digital signal by the A/D converter 39, and is then sent to the control section 36. In step S1, it is determined from the input signal from the A/D converter 39 whether the level of the reception output is equal to or higher than a predetermined value. When the reception level is lower than the predetermined value, that reception data is not accepted. When the user who carries the transmitter 1 comes closer to the automobile and enters the predetermined automatic operation area and it is thus determined that the output level of the A/D converter 39 is equal to or higher than the predetermined value (see FIG. 6(B)), the control section 36 accepts the reception data from the data shaping section 35 (step S2).

The accepted reception data is intermittent, unlike the transmission data, as shown in FIG. 6(C)). The first data in the reception data accepted by the control section 36 (indicated by D in FIG. 6(C)) is decoded by the control section 36. Next, in step S3, it is determined whether or not the identification information (ID code) contained in the reception data coincides with the identification information stored in the memory 37. If it is determined that they do not coincide with each other, the process operation is stopped in step S4 and reception is awaited.

If coincidence of the identification information is obtained in step S3, the command information contained in the reception data is decoded as the door unlocking operation in step S5. Next, in step S6, it is determined from a sensor provided in the door locking mechanism or the information from the operation mechanism 4 whether or not the door is unlocked at present. If the door is locked, the door unlocking command is given to the operation mechanism 4 in step S7, and the door is unlocked. The door unlocking timing is shown in FIG. 6(D).

If it is determined in step S6 that the door has already been unlocked or after the door unlocking command has been given in step S7, the process goes to step S8. In step S8, it is determined whether the magnitude of a subsequent reception data is equal to or higher than a predetermined level. If the reception magnitude is equal to or higher than the predetermined value, the process stays in that state. If the reception magnitude is lower than the predetermined value, the door is automatically locked in step S9. That is, when the user who carries the transmitter 1 moves away from the automobile 2 to the outside the automatic operation area shown in FIG. 1, the reception magnitude reduces to the predetermined level or below or zero. At that time, as shown in FIG. 6(E), no reception data is obtained when subsequent reception data is to be obtained, and the door is thus automatically locked. Thus, when the user who carries the transmitter 1 moves away from the automobile 2, the door is locked automatically, and theft is thus prevented.

The aforementioned case is one in which the user of the transmitter 1 gradually moves toward the automobile 2 and then moves away from the automobile 2. Even if the user who carries the transmitter 1 unlocks the door of the automobile 2, operates the transmitter 1 and then moves away from the automobile, the door is automatically locked when the user is at a certain distance from the automobile.

When, for example, the door unlocking operation and the trunk unlocking operation are conducted at the same time in the manner described above, the door unlocking signal and the trunk unlocking signal are alternately output as the intermittent signal shown in FIG. 6(A). The process operation thereof is the same as that shown in FIGS. 4 and 6.

In the aforementioned embodiment, the remote control device for automobile has been described. However, the objects to be remotely controlled by this remote control device are not limited to the automobile, but other vehicles, opening/closing of a garage, the door of a warehouse or setting of internal environments may also be remotely controlled by the remote control device according to the present invention.

As will be understood from the foregoing description, in the present invention, when the transmitter comes close to the object to be remotely controlled while intermittently transmitting data and the magnitude of the reception thereby exceeds a predetermined value, the operation corresponding to the command of the reception data is performed. Therefore, in the case of, for example, the remote control operation for the automobile, a remote control operation can be performed only by the user's depressing the operation button beforehand and approaching the automobile. Thus, remote control can be easily performed .

What is claimed is:

1. A remote control system comprising:

a transmitter for transmitting a signal containing identification information and command information, the command information corresponding to a selected one of a plurality of commands, said transmitter having at least two operation modes including a first operation mode wherein the transmitter transmits the signal intermittently at a first level, and a second operation mode wherein the transmitter transmits the signal continuously at a second level which is higher than the first level;

a receiver for receiving the signal transmitted from said transmitter, for generating a received signal containing the identification information and command information of the transmitted signal, and for decoding the identification information and the command information contained in the received signal when a level of the received signal is higher than a predetermined value, and for executing a selected command specified by the command information if the decoded identification information coincides with stored identification information.

2. A remote control system of claim 1 wherein the receiver further comprises a monitor circuit for monitoring the level of the received signal and for causing the receiver to reverse the command when the level falls below the predetermined value.

3. A remote control system of claim 1 wherein the receiver further comprises:

a monitor circuit for monitoring the level of the received signal; and a control section for decoding the identification information and command information contained in the received signal when the level is higher than a predetermined value.

4. A remote control system of claim 2 wherein the level of the received signal is limited to a second predetermined value.

5. A remote control system of claim 4 wherein the command is to unlock a door.

6. A remote control system of claim 1 wherein the transmitter comprises a plurality of operation buttons for selecting the operation mode.

7. A remote control system of claim 1 wherein the transmitter comprises a plurality of operation buttons for selecting command information.

8. A remote control system of claim 1 wherein the transmitter, in the first operation mode, intermittently transmits a plurality of signals in an alternating manner, each signal containing command information corresponding to a different selected command.

9. A remote control system of claim 8 wherein the transmitter, in the first operation mode, intermittently transmits a first signal containing command information corresponding to a command for unlocking a door and a second signal containing command information corresponding to a command for unlocking a trunk.

10. A remote control system of claim 1 wherein the transmitter includes means for varying the duration of transmission of the signal when the transmitter is in the first operation mode.

11. A method comprising the steps of:

transmitting a signal in one of at least two operation modes including a first operation mode wherein the transmitter transmits the signal intermittently at a first level, and a second operation mode wherein the transmitter transmits the signal continuously at a second level which is higher than the first level, said signal containing identification information and command information, the command information corresponding to a selected one of a plurality of commands;

receiving the signal transmitted from said transmitter;

generating a received signal containing the identification information and command information of the transmitted signal, determining a level of the received signal;

decoding the identification information and the command information contained in the received signal when a level of the received signal is higher than a predetermined value; and executing a selected command specified by the command information if the decoded identification information coincides with stored identification information.

12. A method of claim 11 further comprising the steps of:

monitoring the level of the received signal; and reversing the command if the level of the received signal falls below the predetermined value.

13. A method of claim 11 comprising intermittently transmitting, in the first operation mode, a plurality of signals in an alternating manner, each signal containing command information corresponding to a different selected command.

14. A method of claim 13 comprising intermittently transmitting, in the first operation mode, a first signal containing command information corresponding to a command for unlocking a door and a second signal containing command information corresponding to a command for unlocking a trunk.

* * * * *